(12) United States Patent
Shimizu

(10) Patent No.: US 7,709,137 B2
(45) Date of Patent: May 4, 2010

(54) ELECTRIC POWER SOURCE

(75) Inventor: Hideo Shimizu, Kakogawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 371 days.

(21) Appl. No.: 11/819,671

(22) Filed: Jun. 28, 2007

(65) Prior Publication Data

US 2008/0003495 A1 Jan. 3, 2008

(30) Foreign Application Priority Data

Jun. 30, 2006 (JP) .............................. 2006-182773

(51) Int. Cl.
*H01M 10/50* (2006.01)
*H01M 6/42* (2006.01)
(52) U.S. Cl. ...................... 429/120; 429/149
(58) Field of Classification Search ............... 429/71
See application file for complete search history.

(56) References Cited

U.S. PATENT DOCUMENTS 4,010,044 A * 3/1977 Schaumburg ............... 429/82
6,340,877 B1 * 1/2002 Mita et al. ................. 320/112
2004/0081885 A1 * 4/2004 Ziegler et al. .............. 429/120

FOREIGN PATENT DOCUMENTS

| JP | 11-329518 | 11/1999 |
|----|-----------|---------|
| JP | 2001-313090 | 11/2001 |
| JP | 2002-50412 | 2/2002 |

* cited by examiner

*Primary Examiner*—Dah-Wei D Yuan
*Assistant Examiner*—Jacob Marks
(74) *Attorney, Agent, or Firm*—Wenderoth, Lind & Ponack, L.L.P.

(57) ABSTRACT

The power source contains a plurality of batteries stacked in more than three tiers within a battery case divided into a first sub holder case and second sub holder case, and the first sub holder case contains the batteries in a larger number of tiers than the second sub holder case. An intermediary duct is provided between the two sub holder cases, and a first outer duct and a second outer duct are respectively provided outside each of the two sub holder cases. The batteries in the holder case are cooled by the cooling air which flows from the intermediary duct through the holder case into the outer duct for exhaustion. Further, the second outer duct is designed to experience a larger pressure loss than the first outer duct.

14 Claims, 6 Drawing Sheets

ELECTRIC POWER SOURCE

BACKGROUND OF THE INVENTION

1. Field of the Invention

The present invention relates generally to an electric power source which contains a plurality of batteries in its battery case and pertains specifically to a power source which is used to supply a power to a motor mainly for driving a vehicle.

2. Description of the Related Art

An electric motor vehicle, such as an electric car and a hybrid car which is designed to travel optionally with an internal combustion engine or with an electric motor, uses an electric power source, having a multitude of batteries interconnected, as a power unit for supplying electric power to a drive motor.

An electric power source used for this kind of application is designed to provide a high output voltage so that a large amount electricity may be supplied to a motor which requires a high power. In order to satisfy such a design need, a multitude of batteries, interconnected in series, are contained in a holder case. For example, a currently commercially available power source mounted to a hybrid car has hundreds of batteries interconnected in series to generate a high output voltage to an extent of several hundreds. Such power source is designed to have five or six pieces of batteries interconnected in series to form a battery module, and further a multitude of such battery modules are interconnected in series within a holder case.

In the electric power source mounted to an electric motor vehicle such as a hybrid car, when the vehicle needs a burst of speed, a large current is discharged to accelerate the motor, and when the vehicle is slowed down or when the vehicle travels down on a slope, a large current is charged by means of a regenerative brake. Such a discharging and charging cycle may often cause the battery to be heated up to a considerably high temperature. In addition, when the battery is used in the surroundings at higher temperatures like in a summer season, the battery temperature tends to be elevated to even higher degrees. In view of these factors, when a power source contains a multitude of batteries in its holder case, it is vital to cool each of contained batteries both effectively and uniformly. This is because various disadvantages are likely to occur when a temperature difference exists among those many batteries being cooled. For example, a battery having undergone a high temperature tends to be degraded and thus results in a reduced amount of real charge capacity for reaching a full charge. When a battery with a reduced amount of real charge capacity is interconnected in series to be charged and discharged with the same current, the battery is very likely to be overcharged or overdischarged. This happens when a full charge capacity and a full discharge capacity have become smaller. A remarkable decrease is caused to a battery in its property or performance through an overcharge and overdischarge, so that a battery with a reduced, real amount of charge capacity is accelerated into degradation. Especially when the battery temperature is elevated to higher degrees, the battery is even more likely to be degraded that much. For these reasons, when an electric power source contains a multitude of batteries in its holder case, it is important to uniformly cool all the batteries so that a temperature irregularity may be prevented.

There have been developed a variety of battery structures to overcome such drawbacks resulting from the temperature irregularity. Refer to Japanese Laid-Open Patent Publication Nos. 2001-313090, 2002-50412 and 1999-329518.

SUMMARY OF THE INVENTION

The power sources, previously disclosed in Japanese Laid-Open Patent Publication Nos. 2001-313090 and 2002-50412, are both developed by the same assignee of the present application. In these power sources, a plurality of cells are linearly interconnected with each other to form a battery module, and a plurality of such battery modules are positioned in a mutually parallel relationship within a holder case. Inside the holder case, the battery modules are cooled by forcibly blowing cooling air in a manner of intersecting the axial direction of the battery modules. The battery modules are disposed in two tiers in the direction of blowing the cooling air. Further, the power source has a plurality of holder cases arranged and contained in an outer case. The power source is capable of adjusting an output voltage by varying the number of holder cases to be contained within the outer case. In addition, each individual holder case has an air-blowing space provided to face the battery modules contained within the holder case. The air-blowing space is meant for allowing the cooling air to be blown to cool the battery modules. Also in order to uniformly cool each individual battery module, there is a control member disposed between the battery modules which are contained in the air-blowing direction so that the member may control a flow of the cooling air.

The power source thus structured is capable of uniformly cooling battery modules contained in two tiers within a holder case. However, when battery modules are to be contained in three or more tiers within the holder case for reducing a total installation area, it becomes difficult or impossible to uniformly cool all the battery modules.

Japanese Laid-Open Patent Application No. 1999-329518, on the other hand, describes a power source which contains battery modules in three or more tiers within a holder case. In that power source, a plurality of battery modules, positioned in a parallel relationship relative to one another and separated along the blowing direction of cooling air, are contained within the holder case in a multi-tier manner. This power source allows the battery modules to be cooled by forcibly blowing the cooling air in between the battery modules. Disadvantageously, however, such a cooling structure is prone to make a cooling performance less efficient for a battery module in the downstream than for battery module in the upstream, thus generating a higher temperature. To overcome such a shortcoming, the holder case has an air turbulence accelerator, such as a dummy battery unit, provided in the uppermost stream so that a stream of cooling air coming into the holder case may be disturbed for allowing the battery module in the upstream to be effectively cooled. Also, the holder case has an auxiliary air intake, provided intermediate in a path of the cooling air, for allowing the cooling air in, and thus a cooling effectiveness is enhanced for a battery in the downstream.

In the above-described power source, a cooling effect for the battery module in the downstream can certainly be enhanced by means of the air turbulence or by the cooling air which is taken in intermediately. With such structure, however, it is impossible to cool all battery modules down to a uniform temperature.

The present invention has been made in order to solve such disadvantages. It is, therefore, the primary object of the present invention to provide an electric power source in which a plurality of batteries, contained within a holder case in a multi-tier manner, are cooled uniformly, with a reduced temperature difference among the batteries.

In order to achieve the above-mentioned objects, the electric power source in accordance with the present invention is configured in the following manner. The power source includes a plurality of batteries 1, a holder case 2 containing the plurality of batteries 1 stacked in more than three tiers, and a battery case 3 including the holder case 2. The holder case 2 is divided into a first sub holder case 2A and a second sub holder case 2B midway of a direction of stacking the batteries 1, and the batteries 1 are contained in a larger number of tiers in the first sub holder case 2A than in the second sub holder case 2B. Further, the battery case 3 includes an intermediary duct 4, for blowing cooling air through, provided inside a holder case 2 which includes the divided first sub holder case 2A and second sub holder case 2B. The battery case 3 is also provided with a first outer duct 5A outside the first sub holder case 2A and a second outer duct 5B outside the second sub holder case 2B. In other words, the battery case 3 is so constructed that the divided first sub holder case 2A and second sub holder case 2B are disposed between the first outer duct 5A and second outer duct 5B, while the intermediary duct 4 is disposed between the first sub holder case 2A and second sub holder case 2B. In the battery case 3, the batteries 1 contained in the holder case 2 are cooled in such a manner that the cooling air is allowed to flow from the intermediary duct 4 through the holder case 2 into the outer duct 5 for exhaustion, or alternatively the cooling air is allowed to flow from the outer duct 5 through the holder case 2 into the intermediary duct 4 for exhaustion. In addition, the second outer duct 5B is designed to experience a larger pressure loss than does the first outer duct 5A, so that the cooling air is blown into the intermediary duct 4 and the outer duct 5 to cool the batteries 1 contained in the holder case 2.

The above-described power source carries the advantage that the batteries are contained within the holder case in a multi-tier manner and all such batteries can be cooled uniformly, with a reduced temperature difference. This is made possible because this power source is featured in that: (1) the plurality of batteries are stacked in more than three tiers within the battery case, and the battery case is divided midway into the first and second sub holder cases which contain the batteries in the different numbers of tiers; (2) the intermediary duct is provided between the divided first and second sub holder cases; (3) the outer duct is respectively provided outside each of the holder cases; (4) cooling air is allowed to flow from the intermediary duct through the holder case into the outer duct or alternatively from the outer duct through the holder case into the intermediary duct, for cooling the batteries contained in the holder case; and (5) the second outer duct which is placed outside the second sub holder case containing the batteries in the smaller number of tiers experiences a larger pressure loss than does the first outer duct which is placed outside the first sub holder case containing the batteries in the larger number of tiers. In particular, the inventive power source is so constructed and arranged that the batteries contained in the battery case in a multi-tier manner are divided into the first and second sub holder cases having the different numbers of battery-stacked tiers, and that each individual battery is uniformly cooled by adjusting the pressure losses prevalent in the outer ducts which are provided outside the holder cases having the different numbers of battery-stacked tiers. Since the batteries are not contained in the same number of tiers in the first and second sub holder cases, the power source thus structured is not limited to the even number of battery-stacked tiers in each of the battery case. For example, to cool the batteries, a power source containing batteries in total five tiers can have the batteries divided into three and two tiers in the holder cases; a power source containing batteries in total six tiers can have the batteries divided into two and four tiers in the holder cases; and a power source containing batteries in total seven tiers can have the batteries divided into four and three tiers in the holder cases. In addition, while a conventional type of power source has suffered difficulties of uniformly cooling the batteries contained in holder cases which have the different numbers of battery-stacked tiers, thus resulting in a larger temperature difference among the batteries, the inventive power source allows the batteries contained in both of the holder cases to be uniformly cooled by adjusting the pressure losses prevalent in the outer ducts placed outside the holder cases. As such, while the battery case is divided into holder cases having the different numbers of battery-stacked tiers, the batteries contained in both of the holder cases can be uniformly cooled, with a reduced temperature difference.

For example, in the power source described in an embodiment of the present invention, batteries are contained in three tiers in the first sub holder case and in two tiers in the second sub holder case. The present power source is so constructed and arranged that the ratio of the first outer duct to the second outer duct is 3:2 by inside width, whereby a pressure loss is increased in the second outer duct due to a smaller inside width. This unique structure serves to improve a maximum temperature deviation among the batteries by 40% as compared with a conventional type of power source in which both of the outer ducts experience the same pressure loss, and the above-described design for the present power source has successfully facilitated cooling all the batteries uniformly, with a reduced temperature difference. Since the battery case is divided midway to be provided with the intermediary duct and allows the cooling air to be blown separately into the upper and lower holder cases from the intermediary duct, the inventive power source has also made it possible to effectively cool all the batteries and to advantageously obtain a considerably reduced battery temperature, as compared with a conventional type of power source that contains batteries in unseparated five tiers.

The present power source can be so constructed and arranged that the first sub holder case 2A is disposed in a lower stage and the second sub holder case 2B is disposed in an upper stage, and also the first outer duct 5A can be provided below the first sub holder case 2A, the intermediary duct 4 can be provided midway between the first sub holder case 2A and the second sub holder case 2B, and the second outer duct 5B can be provided above the second sub holder case 2B.

The present power source can be so constructed and arranged that an inside width (W2) in the second outer duct 5B is made narrower than an inside width (W1) in the first outer duct 5A so that a pressure loss in the second outer duct 5B is made larger than a pressure loss in the first outer duct 5A.

The present power source can be so constructed and arranged that the batteries 1 are contained respectively in "m" number of tiers in the first sub holder case 2A and in "n" number of tiers in the second sub holder case 2B, such that a ratio of the inside width (W1) in the first outer duct 5A to the inside width (W2) in the second outer duct 5B is m:n.

The present power source can be so constructed and arranged that a porous material is disposed inside the second outer duct 5B so that the pressure loss in the second outer duct 5B is made larger than the pressure loss in the first outer duct 5A.

The present power source can be so constructed and arranged that each of the holder case 2 (i.e., 2A and 2B) contains the batteries 1 in a plurality of tiers inside a pair of opposed walls 11, 21, and that the pair of opposed walls 11, 21 are closed, at an inlet side and an exhaust side, by an inlet wall 12, 22 and an exhaust wall 13, 23 to thus obtain a chamber 14, 24 defined by the pair of opposed walls 11, 21, the inlet wall 12, 22 and the exhaust wall 13, 23, so that the batteries 1 can be contained in the chamber 14, 24. The inlet wall 12, 22 has an inlet hole 15, 25, defined on both of lateral portions of the inlet wall 12, 22, for allowing the cooling air to flow inwardly, so that the cooling air can be blown inwardly from the inlet hole 15, 25 into a space defined by and between the battery 1 and the opposed walls 11, 21. The exhaust wall 13, 23, on the other hand, has an exhaust hole 16, 26, defined in a middle portion, for allowing the internal cooling air to flow outwardly, so that the cooling air flowing along a surface of the battery 1 can be blown outwardly from the middle portion. Further, the opposed wall 11, 21 may have a ridge 17, 27 protruding inwardly toward and between two adjacent batteries 1, and a height of such inwardly protruding ridge 17, 27 may be made greater in the leeward than in the windward.

The present power source can be so constructed and arranged that, in the chamber 14, the first sub holder case 2A contains a first battery 1A, a second battery 1B and a third battery 1C in three tiers along the air-blowing direction, and that the opposed wall 11 has a first ridge 17A provided between the first battery 1A and the second battery 1B as well as having a second ridge 17B provided between the second battery 1B and the third battery 1C, with the second ridge 17B being made inwardly higher than the first ridge 17A.

The present power source can be so constructed and arranged that the opposed wall 11 is curved, on both of lateral surfaces of the second ridge 17B, to matingly face a surface of the nearest battery 1.

The present power source can be so constructed and arranged that the inner surface is curved, in the vicinity of a boundary between the exhaust wall 13 and the opposed wall 11, to matingly face the surface of the nearest battery 1, thus providing an air flow space 18 with respect to the battery 1.

The above and further objects of the present invention as well as the features thereof will become more apparent from the following detailed description to be made in conjunction with the accompanying drawings.

DETAILED DESCRIPTION OF THE PREFERRED EMBODIMENT(S)

Figure 1:
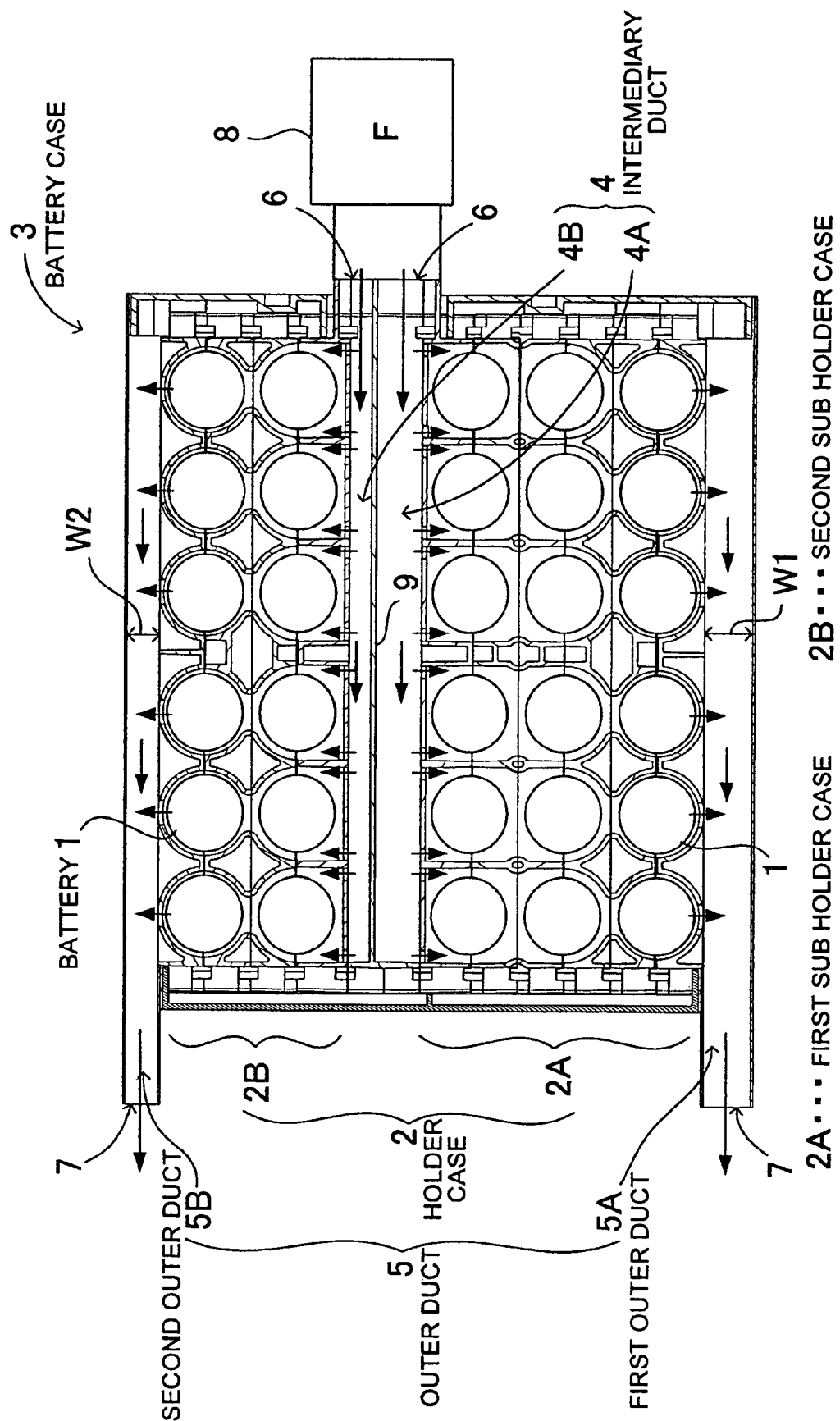
FIG. 1 is a cross-sectional view of the electric power source in accordance with an embodiment of the present invention.
Figure 2:
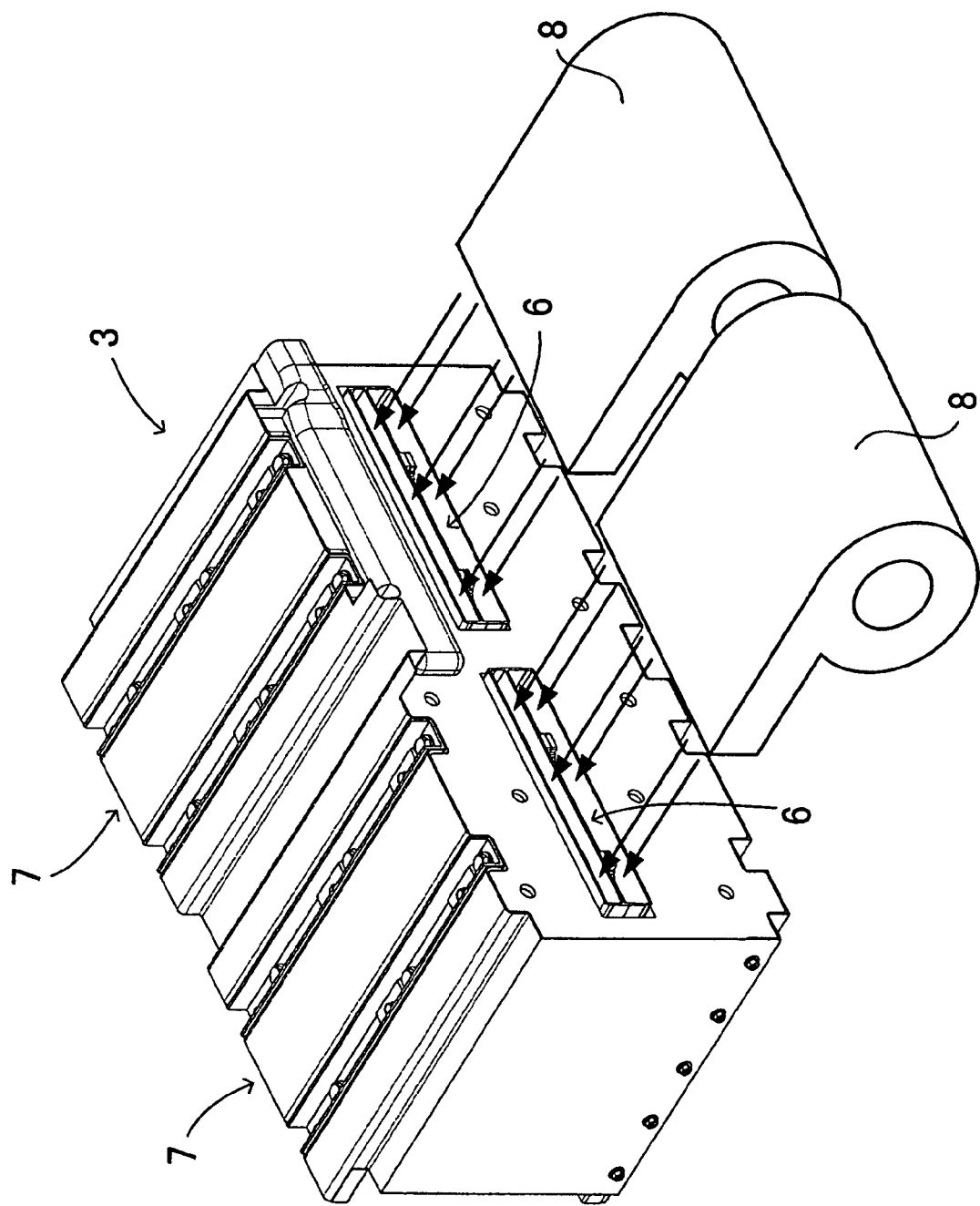
FIG. 2 is a perspective view of the electric power source in accordance with an embodiment of the invention.

The electric power source, shown in the cross-sectional view in FIG. 1 and the perspective view in FIG. 2, contains a plurality of batteries 1 stacked in five tiers within the battery case 3. Although the illustrated power source contains the batteries 1 in five tiers, the inventive power source may contain batteries in seven or more tiers as well. The battery case 3 is divided into a first sub holder case 2A and a second sub holder case 2B midway of the direction of stacking the batteries 1, namely, midway between upper and lower stages as viewed in the Figure. In the illustrated battery case 3, the first sub holder case 2A is disposed in the lower stage and the second sub holder case 2B is disposed in the upper stage. Being thus divided, the first sub holder case 2A contains the batteries 1 in the greater number of tiers than does the second sub holder case 2B. In the illustrated battery case 3, the batteries 1 are contained in three tiers within the first sub holder case 2A and in two tiers within the second sub holder case 2B. In such a configuration that the first sub holder case 2A in the lower stage contains the batteries 1 in the larger number of tiers than does the second sub holder case 2B in the upper stage, the electric power source carries the advantage of being supported stably by shifting its center of gravity downwardly. Also, the first sub holder case 2A and the second sub holder case 2B contains the batteries 1 laterally in six columns. The holder case 2 contains all the batteries 1 in a parallel relationship with respect to one another, in a multi-tier manner and in a multi-column manner. It should be noted, however, that the holder case may also contain the batteries in seven or more columns or in five or less columns.

The battery case 3 is provided with an intermediary duct 4, placed inside the holder case 2 between the divided first sub holder case 2A and second sub holder case 2B, for blowing battery-cooling air through. Further, a first outer duct 5A is provided below or outside the first sub holder case 2A, and a second outer duct 5B is provided above or outside the second sub holder case 2B. In other words, the battery case 3 is so constructed that the divided first sub holder case 2A and second sub holder 2B are disposed between the first outer duct 5A and second outer duct 5B, while the intermediary duct 4 is disposed between the first sub holder case 2A and second sub holder case 2B. In the holder case 2, a supply port 6 and an exhaust port 7 are opened for the cooling air to flow through, each of which is connected respectively to the intermediary duct 4 and the outer duct 5, so that the cooling air may be blown into the intermediary duct 4 and the outer duct 5.

Figure 6:
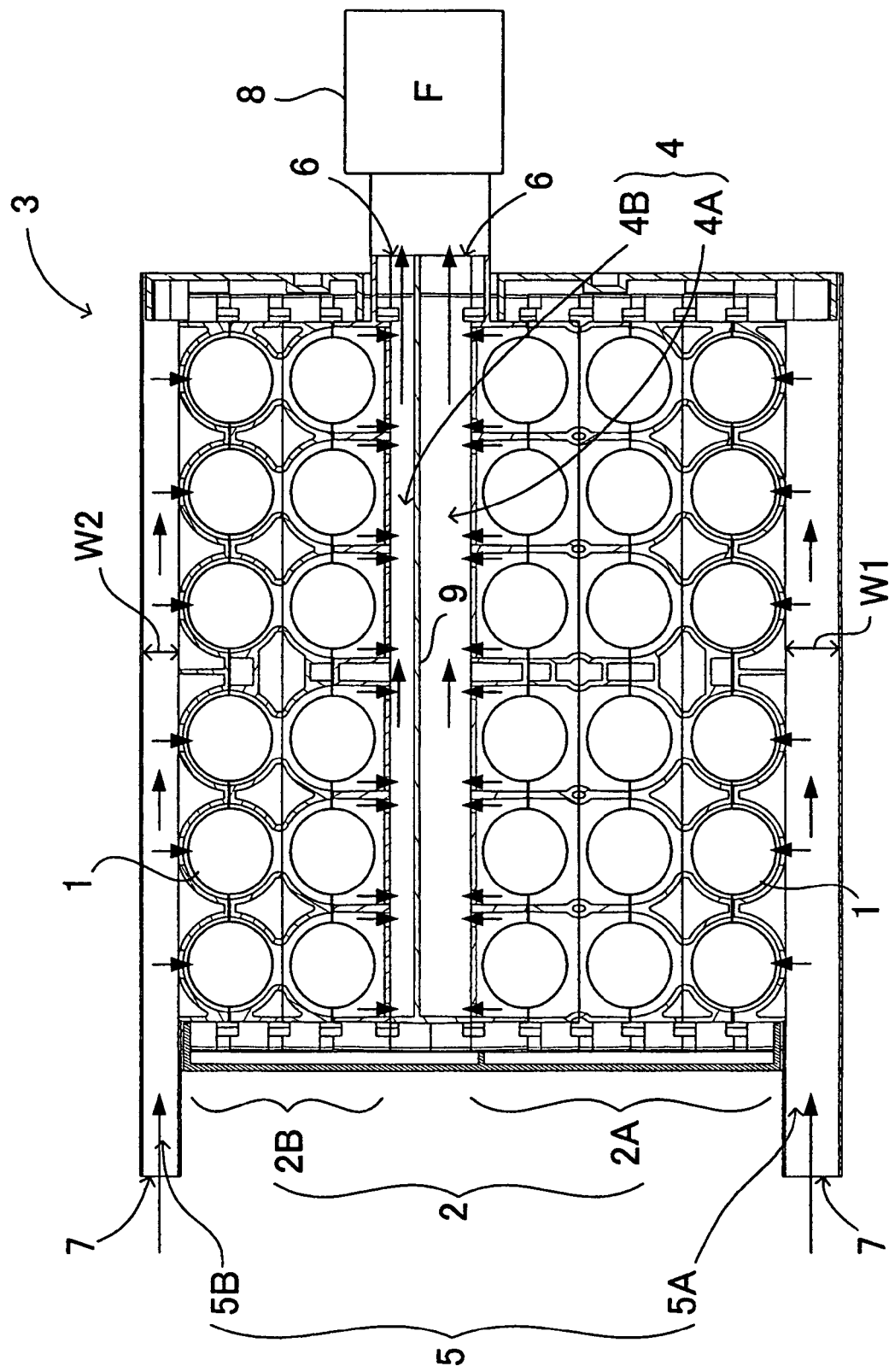
FIG. 6 is a cross-sectional view of the electric power source in accordance with an alternative embodiment of the present invention.

The power source shown in FIG. 1 is designed to cool the batteries 1 contained in the holder case 2 by allowing the cooling air to flow from the intermediary duct 4 through the holder case 2 into the outer duct 5 for exhaustion. This power source has the holder case 2 in which the supply port 6 is connected to the intermediary duct 4 and the exhaust hole 7 is connected to the outer duct 5. Further, the illustrated power source has a cooling fan 8, connected to the supply port 6 in the holder case 2, for forcibly blowing the cooling air into the intermediary duct 4. The illustrated power source is so designed that the cooling air forcibly blown from the cooling fan 8 is supplied from the supply port 6 to the intermediary duct 4, passed from the intermediary duct 4 to the holder case 2, and exhausted from the outer duct 5 through the exhaust port 7. It should be noted, however, that the inventive power source may, as shown in FIG. 6, be so constructed and arranged that the batteries contained in the holder case are cooled by allowing the cooling air to flow from the outer duct through the holder case into the intermediary duct for exhaustion.

In order to uniformly cool the batteries 1 contained in the first sub holder case 2A and the second sub holder case 2B, with a reduced temperature difference, the second outer duct 5B is designed to experience a larger pressure loss than does the first outer duct 5A. In the power source shown in FIG. 1, an inside width (W2) in the second outer duct 5B is set to be narrower than an inside width (W1) in the first outer duct 5A so that the pressure loss in the second outer duct 5B is greater than the pressure loss in the first outer duct 5A. In particular, the power source shown in FIG. 1 is featured in that the batteries 1 are contained in three tiers within the first sub holder case 2A and in two tiers within the second sub holder case, and that the ratio of the inside width (W1) in the first outer duct 5A to the inside width (W2) in the second outer duct 5B is set to be 3:2. The power source is so designed that the inside width (W2) in the second outer duct 5B is narrower to allow a smaller amount of cooling air to be circulated, while the inside width (W1) in the first outer duct 5A is wider to allow a greater amount of cooling air to be circulated, and thus the batteries 1 contained in three tiers can be effectively cooled by the cooling air, with a reduced temperature difference among all the batteries 1.

Further, although not illustrated, the present power source may be so constructed and arranged that the batteries 1 are contained respectively in "m" number of tiers within the first sub holder case and in "n" number of tiers within the second sub holder case, where m>n, and that the ratio of the inside width in the first outer duct to the inside width in the second outer duct is set to be m:n. In this power source as well, the inside width in the first outer duct may be made larger to allow a greater amount of cooling air to be circulated, and the inside width in the second outer duct may be made smaller to allow a smaller amount of cooling air to be circulated, and thus the batteries contained in a multi-tier manner within the first sub holder case can be effectively cooled, with a reduced temperature difference among all the batteries.

Figure 3:
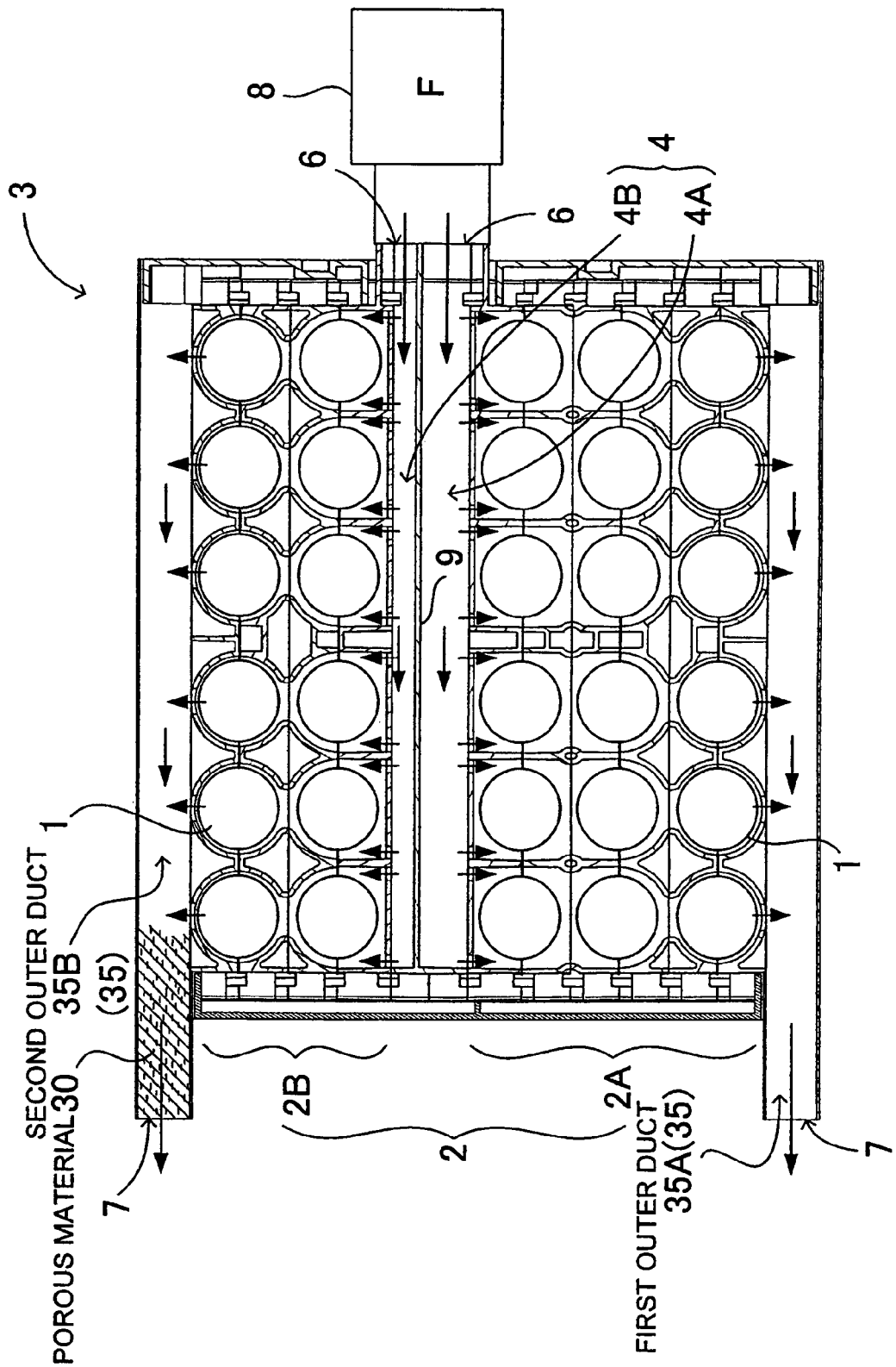
FIG. 3 is a cross-sectional view of the electric power source in accordance with an alternative embodiment of the invention.

Although the illustrated power source is designed to control pressure losses by adjusting the inside widths in the first outer duct 5A and the second outer duct 5B, the inventive power source, as shown in FIG. 3, may be so constructed and arranged that a porous material 30 is disposed inside the second outer duct 35B so that the pressure loss in the second outer duct 35B is greater than the pressure loss in the first outer duct 35A. The porous material 30 may be either a non-woven fabric in which fibers or filaments are collectively constructed in random directions to produce voids or vacancies among the fibers, or a foamed plastic material in which a plastic material is expanded to produce minute vacancies of open cells. The porous material 30, being placed at the exhaustion end in the outer duct 35, allows the cooling air to be exhausted from the outer duct 35 through minute vacancies formed in the porous material 30. The outer duct 35 increases the pressure loss by allowing the cooling air to pass through minute vacancies formed in the porous material 30. As such, the porous material 30 filled in the outer duct 35 is able to increase the pressure loss by reducing a vacancy rate or reducing the vacancy size. It is also possible that the pressure loss is increased by allowing the porous material 30 filled in the outer duct 35 to be dimensioned longer in the flowing direction of the cooling air. In the inventive power source, the porous material 30 is disposed in the second outer duct 5B so that all the batteries 1 contained in the first sub holder case 2A and the second sub holder case may be cooled uniformly. For example, in the case of a power source in which the batteries are contained in "m" number of tiers within the first sub holder case and in "n" number of tiers within the second sub holder case, where m>n, a porous material is disposed in the second duct so that the ratio of the amount of cooling air blown into the first outer duct to the amount of cooling air blown into the second outer duct is about m:n, and thus all the batteries contained in the holder case can be uniformly cooled. Further, although not illustrated, the power source may be so constructed and arranged that a porous material is disposed both in the first outer duct and in the second outer duct, and that the amounts of cooling air blown into the first outer duct and the second outer duct are adjusted.

Further, the power source shown in FIG. 1 has the interior of the intermediary duct 4 segmented into the upper and lower portions. The illustrated intermediary duct 4 is provided with a partition 9 midway between the upper and lower portions to have the interior segmented into the first intermediary duct 4A and the second intermediary duct 4B. The illustrated intermediary duct 4 has the lower portion below the partition 9 linked to the first sub holder case 2A, as a first intermediary duct 4A, and the upper portion above the partition 9 linked to the second sub holder case 2B, as a second intermediary duct 4B. Such structure of segmenting the interior of the intermediary duct 4 to be linked to the first sub holder case 2A and the second sub holder case 2B is featured in that the cooling air can be smoothly blown because the cooling air is blown after being separated into the segmented first intermediary duct 4A and second intermediary duct 4B. It should be noted, however, that the interior of the intermediary duct does not necessarily have to be segmented into the first and second intermediary ducts; hence the cooling air can also be forcibly blown from the non-segmented intermediary duct separately into the first sub holder case and the second sub holder case.

Further, in the illustrated intermediary duct 4, the inside width in the first intermediary duct 4A is made larger than the inside width in the second intermediary duct 4B, so that the amount of cooling air to be forcibly blown into the first sub holder case 2A is greater than the amount of cooling air to be forcibly blown into the second sub holder case 2B. In this configuration for the intermediary duct 4, the amounts of the cooling air to be forcibly blown into the first sub holder case 2A and the second sub holder case 2B can be ideally controlled by adjusting the inside widths in the first intermediary duct 4A and the second intermediary duct 4B. The intermediary duct, however, may be designed to have the same inside width in the first intermediary duct and second intermediary duct. This is because the amounts of cooling air to be forcibly blown into the first and second sub holder cases can be adjusted by controlling the pressure losses based on the widths and structure in the first and second outer ducts.

The battery 1 is contained in the holder case 2 in a state of battery module in which a plurality of unit cells are linearly interconnected in series. For example, four pieces of unit cells are linearly interconnected in each battery module. However, the battery module may optionally have three or less pieces of unit cells or five or more pieces of unit cells interconnected. The unit cell is a nickel-hydrogen battery/cell. However, the unit cell may be any other kind of secondary battery such as a lithium-ion cell and nickel-cadmium cell. The illustrated battery module is formed in a columnar state, with cylindrical unit cells being linearly interconnected.

The battery modules as the batteries 1, being contained in the holder case 2, are interconnected in series by using a bus-bar (not shown). The bus-bar is fixed to an end plate (not shown) in the holder case 2. The end plate, being positioned in contact with opposed end surfaces in the battery module, is fixed to the holder case 2. The end plate, being formed with an insulator such as a plastic material, connects in a predetermined position the bus-bar which is fixed to electrode terminals provided on the opposed ends of the battery module. The bus-bar is a metallic plate which interconnects the adjoining battery modules in series. The end plate is fixed to the battery module by screwing the bus-bar and fixed to the holder case 2 in a predetermined position.

The holder case 2 contains the battery modules in a parallel relationship with respect to one another in a plurality of tiers along the blowing direction of the cooling air (in the vertical direction as viewed in the Figure). The battery modules are contained in three tiers in the first sub holder case 2A and in two tiers in the second sub holder case 2B. To add an explanation, FIG. 4 and FIG. 5 show enlarged, cross-sectional views of the holder case 2 in the power source as shown in FIG. 2, with FIG. 4 depicting the first sub holder case 2A and with FIG. 5 depicting the second sub holder case 2B.

The first sub holder case 2A and the second sub holder case 2B respectively have their interior portion partitioned into a plurality of chambers 14, 24, and the batteries 1 are contained in a plurality of tiers in each of the chambers 14, 24. The first sub holder case 2A and the second sub holder case 2B contain the batteries 1 in a plurality of tiers inside a pair of opposed walls 11, 21, and the pair of opposed walls 11, 21 are closed, at the inlet side and the exhaust side, by an inlet wall 12, 22 and an exhaust wall 13, 23 to define the chamber 14, 24 by the pair of opposed walls 11, 21, the inlet wall 12, 22 and the exhaust wall 13, 23, so that the batteries 1 are contained in the chamber 14, 24.

Figure 4:
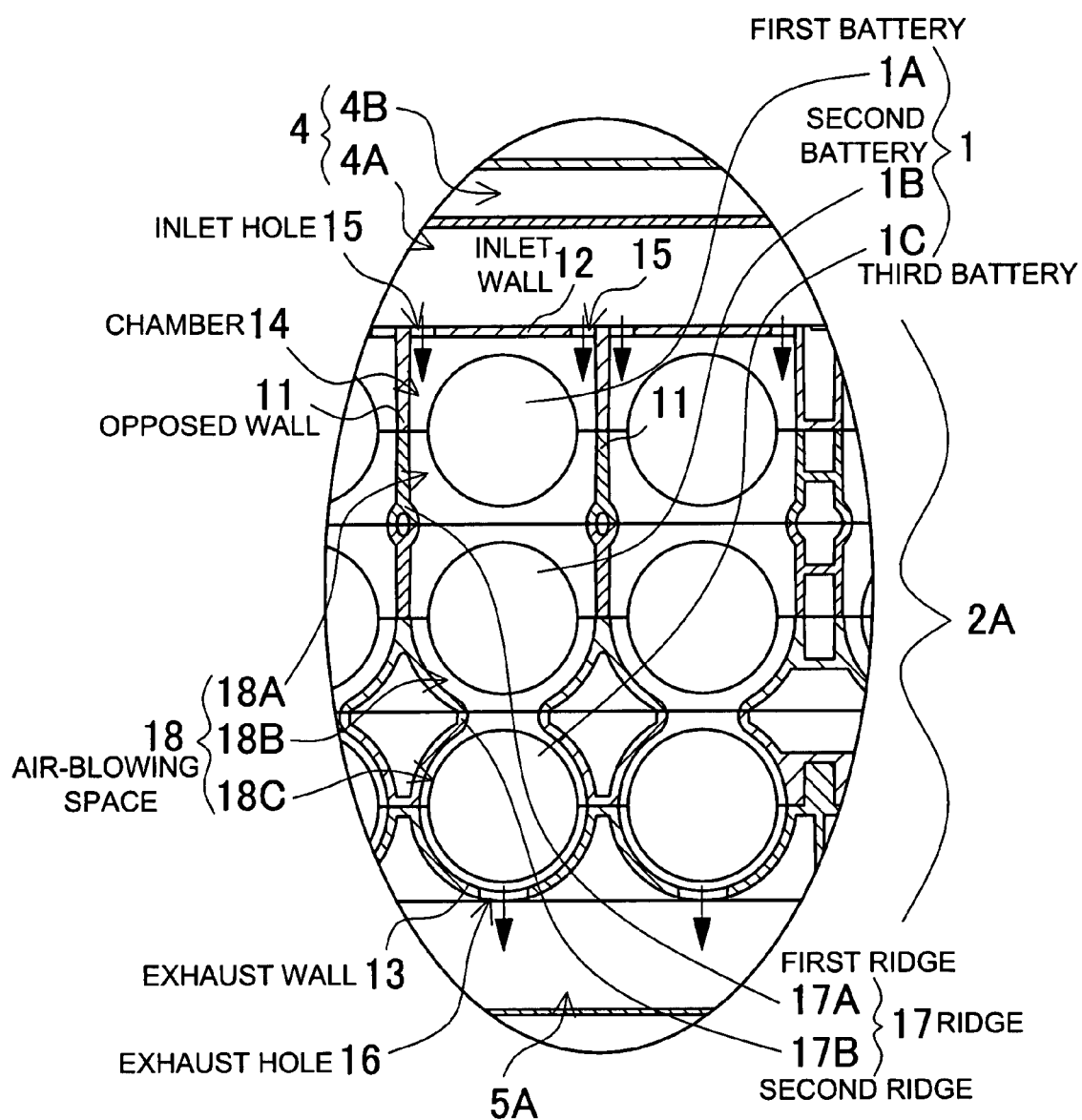
FIG. 4 is an enlarged, cross-sectional view of the first sub holder case in the electric power source as shown in FIG. 1.
Figure 5:
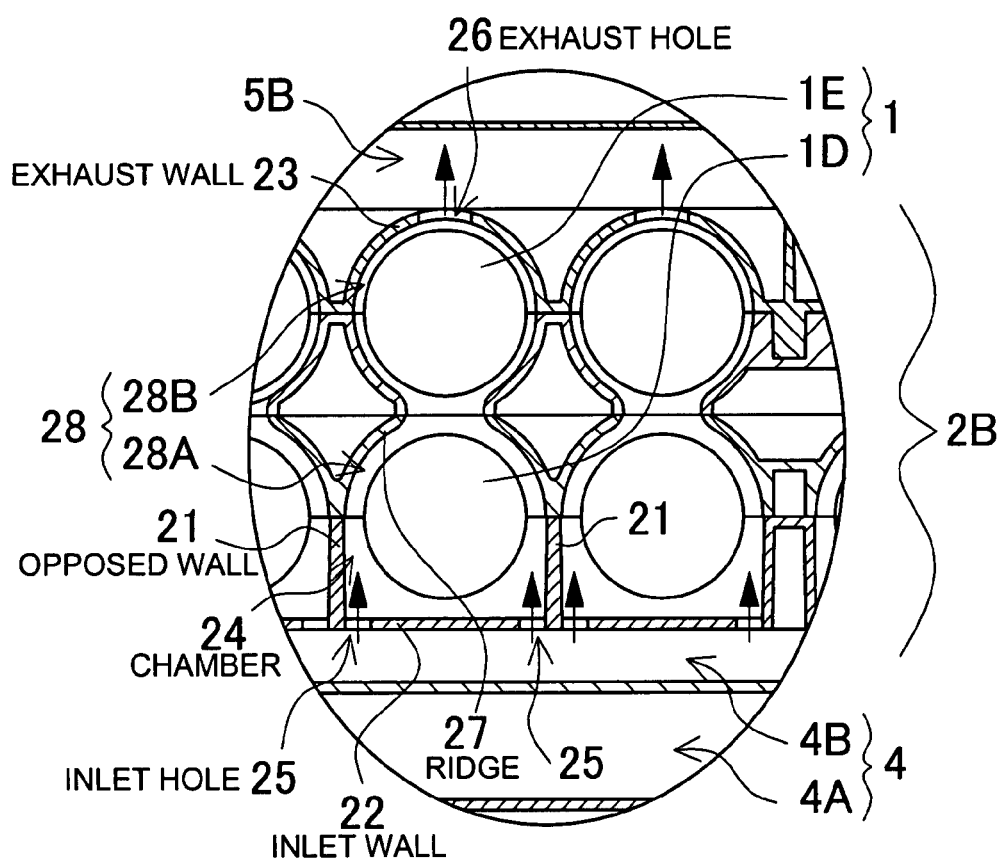
FIG. 5 is an enlarged, cross-sectional view of the second sub holder case in the electric power source as shown in FIG. 1.

The first sub holder case 2A shown in FIG. 4 contains the batteries 1 in three tiers per column between a pair of opposed walls 11. The first sub holder case 2A contains a first battery 1A, a second battery 1B and a third battery 1C in three tiers along the air-blowing direction (from the top to the bottom as viewed in the Figure). The second sub holder case 2B shown in FIG. 5 contains the batteries 1 in two tiers per column between a pair of opposed walls 21. The second sub holder case 2B contains a fourth battery 1D and a fifth battery 1E in two tiers along the air-blowing direction (from the bottom to the top as viewed in the Figure). The first sub holder case 2A and the second sub holder case 2B respectively have an inlet hole 15, 25 and an exhaust hole 16, 26 opened for blowing the cooling air to the batteries 1 thus contained. The cooling air coming from the inlet hole 15, 25 to the holder case 2 is exhausted through the exhaust port 16, 26 after cooling the batteries 1.

The first sub holder case 2A and the second sub holder case 2B respectively have an inlet hole 15, 25 opened in the inlet wall 12, 22 and an exhaust hole 16, 26 opened in the exhaust wall 13, 23. The inlet hole 15 is opened at two lateral portions of the inlet wall 12 and allows the cooling air coming in through the hole to be blown into a space between the first battery 1A and the opposed wall 11. The illustrated inlet wall 12 has the inlet hole 15 opened just above the inner surface of the opposed wall 11. The inlet hole 15 allows the cooling air to be blown along the inner surface of the opposed wall 11, so that the cooling air passes through the space between the opposed wall 11 and the first battery 1A. The inlet hole 25 is opened at two lateral portions of the inlet wall 22 and allows the cooling air coming in through the hole to be blown into a space between the fourth battery 1D and the opposed wall 21. The illustrated inlet wall 22 has the inlet hole 25 opened just below the inner surface of the opposed wall 21. The inlet hole 25 allows the cooling air to be blown along the inner surface of the opposed wall 21, so that the cooling air passes through the space between the opposed wall 21 and the fourth battery 1D.

Although the inlet hole 15, 25 is opened at two lateral portions of the inlet wall 12, 22, the location of the hole is not necessarily limited to the illustrated portion just above or below the inner surface of the opposed wall 11, 21. For example, the inlet hole may be opened in a portion shifted slightly toward the central portion away from the portion just above or below the inner surface of the opposed wall. However, when the inlet hole is to be opened in the central portion of the inlet wall, there arises a disadvantage that the cooling air will cool the first or fourth battery excessively when compared with other batteries. Although the first battery 1A and the fourth battery 1D experience a great amount of heat exchange at their lateral portions, namely in the first air-blowing spaces 18A, 28A near the opposed walls 11, 21, but do not experience a great amount of heat exchange in other portions. The cooling air for cooling the first battery 1A or the fourth battery 1D has a lower temperature than does the cooling air for cooling other batteries, so that the battery is effectively cooled in a narrow air-blowing space.

If the inlet hole is supposed to be opened in the central portion of the inlet wall, the cooling air coming through the inlet hole into the holder case will flow along the half or semicircular surface of the battery facing the inlet wall and cool the battery. A well-balanced, uniform cooling effect with respect to other batteries is achieved when the first and fourth batteries are cooled only in the air-blowing space existing laterally with respect to the opposed wall, without being cooled on the outer surface facing the inlet wall. For this purpose, the inlet hole 15, 25 is not opened in the central portion of the inlet wall 12, 22. Even if shifted slightly toward the central portion away from the portion just above or below the inner surface of the opposed wall 11, 21, the inlet hole 15, 25 should still be opened in a position outer than the middle point between the portion just above or below the surface of the opposed wall 11, 21 and the central portion of the inlet wall 12, 22.

Unlike the inlet hole 15, 25, the exhaust hole 16, 26 is opened along the middle portion of the exhaust wall 13, 23. This is done so, because in the first sub holder case 2A shown in FIG. 4 the third battery 1C can be effectively cooled by allowing the cooling air coming out of the chamber 14 to be blown along the lower surface of the third battery 1C, and in the second sub holder case 2B shown in FIG. 5 the fifth battery 1E can be effectively cooled by allowing the cooling air coming out of the chamber 24 to be blown along the upper surface of the fifth battery 1E. In FIG. 4, the exhaust hole 16 opened in the central portion of the exhaust wall 13 allows the cooling air separated into the two lateral sides of the battery 1 to be blown along the lower half or semicircular surface of the third battery 1C, and the air is collected at the central portion of the exhaust wall 13 to be exhausted. Also in FIG. 5, the exhaust hole 26 opened in the central portion of the exhaust wall 23 allows the cooling air separated into the two lateral sides of the battery 1 to be blown along the upper half or semicircular surface of the fifth battery 1E, and the air is collected at the central portion of the exhaust wall 23 to be exhausted. In the illustrated holder case 2, the inner surface in the vicinity of the boundary between the exhaust wall 13, 23 and the opposed wall 11, 21 is so curved as to matingly face the surface of the battery 1. In the holder case 2 thus configured with the inner surface in the exhaust side to matingly face the surface of the battery 1, the cooling air can be blown along the surface of the battery 1 and collected at the exhaust hole 16, 26 for outward exhaustion. As such, when the battery on the exhaustion side is effectively cooled and a reduced amount of heat exchange caused by a temperature increase of the cooling air is corrected, a temperature difference can be reduced among the batteries 1.

Further, the illustrated holder case 2 is provided with a ridge 17, 27 which is protruded from the interior surface of the opposed wall 11, 21 so that an air-blowing state is controlled in the air-blowing space 18, 28 between the battery 1 in each tier and the opposed wall 11, 21. The ridge 17, 27 is provided in a manner of protruding between two batteries 1 disposed adjacently.

The amount of heat exchange to be involved in cooling the battery module by the cooling air varies in accordance with a temperature difference between the cooling air and the battery module, a velocity of the cooling air, and the size of contact area with respect to the cooling air to be blown. The amount of heat exchange decreases when the temperature difference decreases between the cooling air and the battery module. As such, when an increased temperature of the cooling air causes the temperature difference to decrease with respect to the battery module, the amount of heat exchange decreases accordingly. In the leeward, the temperature of the cooling air increases by absorbing the heat of the battery module. Therefore, the battery module in the leeward experiences a reduced amount of heat exchange due to the temperature increase of the cooling air.

The amount of heat exchange can be increased when the velocity of the cooling air is increased and when the contact area is enlarged with respect to the cooling air to be blown. The protrusion height of the ridge 17, 27 determines the velocity and the size of contact area of the cooling air blown onto the surface of the battery 1. When the protrusion height of the ridge is increased, the ridge comes closer to the surface of the battery, reducing the air-blowing space present with respect to the battery. A ridge with a greater protrusion height also increases the size of area in the air-blowing space present with respect to the battery. Thus, the decreased amount of heat exchange caused by the gradually increased temperature of the cooling air is corrected by the ridge 17, 27 to cool all the batteries 1 uniformly.

In the first sub holder case 2A shown in FIG. 4, the inward protrusion height of the ridge 17 is set to be higher in the leeward than in the windward, so that the region of the air-blowing space 18 in the leeward, namely, the size of contact area with respect to the battery 1 is increased or the gap in the air-blowing space 18 is decreased. The opposed wall 11 in the first sub holder case 2A shown in FIG. 4 is provided with a first ridge 17A between the first battery 1A and the second battery 1B, and is also provided with a second ridge 17B between the second battery 1B and the third battery 1C. The second ridge 17B, being higher than the first ridge 17A, is more adjacent to the surface of the battery 1 than is the first ridge 17A.

Further, in the opposed wall 11 shown in FIG. 4, both of the lateral surfaces in the second ridge 17B are so curved as to matingly face the surfaces of the nearest batteries 1. By provision of a uniform, air-blowing space 18B with respect to the battery 1, the ridge 17B enables the cooling air to be smoothly blown. Also, in the illustrated first sub holder case 2A, the inner surface in the vicinity of the boundary between the exhaust wall 13 and the opposed wall 11 is so curved as to matingly face the surface of the third battery 1C. Thus, in the first sub holder case 2A in which the inner surface on the exhaustion side faces matingly the surface of the third battery 1C, the cooling air can be blown along the surface of the battery 1 and collected at the exhaust hole 16 for outward exhaustion. As such, when the third battery 1C is effectively cooled, the reduced amount of heat exchange caused by the temperature increase of the cooling air can be corrected to reduce the temperature difference among the batteries 1.

In the above-described holder case 2A, the first air-blowing space 18A is provided to correspond with the first battery 1A at the two lateral sides only, the second air-blowing space 18B is provided to correspond with the second battery 1B at the half portion in the leeward, and the third air-blowing space 18C is provided to correspond with the third battery 1C both in the windward and in the leeward. With this configuration, the size of area of the air-blowing space 18, for the cooling air to be blown along the surface of the batteries 1, is increased from the first air-blowing space 18A toward the third air-blowing space 18C.

Further, in the first holder case 2A shown in FIG. 4, the velocity of the cooling air to be blown along the surface of the third battery 1C is made greater than the velocity of the cooling air to be blown along the surface of the second battery 1B, which is made possible by making the second ridge 17B higher than the first ridge 17A so that the gap in the third air-blowing space 18C becomes smaller than the gap in the second air-blowing space 18B with respect to the battery.

Although not illustrated, the first sub holder case 2A containing the batteries 1 in three tiers does not necessarily have to be provided with the first ridge which is provided between the first battery and the second battery, because the second battery can be cooled at the leeward, half portion by providing the air-blowing space defined by the second ridge. In regard to the second air-blowing space to be provided here, either of the following configurations facilitates uniformly cooling the first battery module, the second battery module and the third battery module. As compared with the first air-blowing space provided to correspond with the battery at both of the lateral sides, the second air-blowing space is made wider to increase the size of contact area with respect to the cooling air or the gap in the space is made smaller. Alternatively, as compared with the third air-blowing space, the second air-blowing space is made narrower to decrease the size of contact area with respect to the cooling air or the gap in the space is made larger.

In the opposed wall 21 shown in FIG. 5, both of the lateral surfaces in the ridge 27 are so curved as to matingly face the surface of the nearest battery 1. The ridge 27 enables the cooling air to be blown smoothly by providing a uniform, air-blowing space 28 with respect to the battery 1. In the illustrated second sub holder case 2B, the first air-blowing space 28A is provided to correspond with the fourth battery 1D at the leeward, half portion, and the second air-blowing space 28B is provided to correspond with the firth battery 1E both at the windward surface and at the leeward surface. With this configuration, the size of area of the air-blowing space 28, for the cooling air to be blown along the surface of the batteries 1, is increased from the first air-blowing space 28A toward the second air-blowing space 28B.

The above-described holder case 2 is structured with the first sub holder case 2A to contain the batteries in three tiers and with the second sub holder case 2B to contain the batteries in two tiers. However, the first sub holder case may also be so structured as to contain the batteries in four or more tiers, and the second sub holder case may be so structured as to contain the batteries in three or more tiers. Although not illustrated, these holder cases should be so structured as to uniformly cool the batteries contained in a multi-tier manner by adjusting the gap in the air-blowing space through altering the height or shape of a plurality of ridges provided in the opposed wall.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

The present application is based on Application No. 2006-182773 filed in Japan on Jun. 30, 2006, the content of which is incorporated herein by reference.

What is claimed is:

1. An electric power source comprising:
a plurality of batteries; and
a battery case including a holder case containing the plurality of batteries stacked in more than three tiers,
wherein the holder case is divided into a first sub holder case and a second sub holder case disposed in a direction of stacking the batteries, the batteries being contained in a larger number of tiers in the first sub holder case than in the second sub holder case,
wherein the battery case comprises an intermediary duct for transfer of cooling air therethrough, the intermediary duct being provided inside the holder case between the first sub holder case and second sub holder case,
wherein the battery case comprises an outer duct which comprises a first outer duct disposed outside the first sub holder case and a second outer duct disposed outside the second sub holder case,
wherein the first sub holder case and the second sub holder case are disposed between the first outer duct and the second outer duct, and the intermediary duct is disposed between the first sub holder case and the second sub holder case, so that the batteries contained in the holder case are cooled in such a manner that the cooling air is allowed to flow from the intermediary duct through the holder case into the first and second outer ducts for exhaustion, or alternatively the cooling air is allowed to flow from the first and second outer ducts through the holder case into the intermediary duct for exhaustion, and
wherein the second outer duct is designed to experience a larger pressure loss than the first outer duct, so that the cooling air is blown into the intermediary duct and the outer duct to cool the batteries contained in the holder case,
wherein an inside width in the second outer duct is made narrower than an inside width in the first outer duct so that a pressure loss in the second outer duct is larger than a pressure loss in the first outer duct, and
wherein the batteries are contained respectively in "m" number of tiers in the first sub holder case and in "n" number of tiers in the second sub holder case, such that a ratio of the inside width in the first outer duct to the inside width in the second outer duct is m:n.

2. The electric power source as recited in claim 1, wherein the first sub holder case is disposed in a lower stage and the second sub holder case is disposed in an upper stage, and also the first outer duct is provided below the first sub holder case, the intermediary duct is provided between the first sub holder case and the second sub holder case, and the second outer duct is provided above the second sub holder case.

3. The electric power source as recited in claim 1, wherein a porous material is disposed inside the second outer duct so that the pressure loss in the second outer duct is made larger than the pressure loss in the first outer duct.

4. The electric power source as recited in claim 3, wherein the porous material is placed at an exhaustion end in the outer duct.

5. The electric power source as recited in claim 3, wherein the porous material allows the cooling air to be exhausted from the second outer duct through minute vacancies formed in the porous material.

6. The electric power source as recited in claim 1, wherein the batteries are contained in three tiers in the first sub holder case and in two tiers in the second sub holder case.

7. The electric power source as recited in claim 1, wherein the electric power source is a power source for a motor vehicle.

8. The electric power source as recited in claim 1, wherein the batteries contained in the holder case are cooled by allowing the cooling air to flow from the intermediary duct through the holder case into the first and second outer ducts for exhaustion.

9. The electric power source as recited in claim 1, wherein the batteries contained in the holder case are cooled by allowing the cooling air to flow from the first and second outer ducts through the holder case into the intermediary duct for exhaustion.

10. An electric power source comprising:
a plurality of batteries; and
a battery case including a holder case containing the plurality of batteries stacked in more than three tiers,
wherein the holder case is divided into a first sub holder case and a second sub holder case disposed in a direction of stacking the batteries, the batteries being contained in a larger number of tiers in the first sub holder case than in the second sub holder case,
wherein the battery case comprises an intermediary duct for transferring cooling air, the intermediary duct being provided inside the holder case between the first sub holder case and second sub holder case,
wherein the battery case comprises a first outer duct disposed outside the first sub holder case and a second outer duct disposed outside the second sub holder case, such that the first sub holder case and second sub holder case are disposed between the first outer duct and the second outer duct, and the intermediary duct is disposed between the first sub holder case and the second sub holder case so that the batteries contained in the holder case are cooled in such a manner that the cooling air is allowed to flow from the intermediary duct through the holder case into the first and second outer ducts for exhaustion, or alternatively, the cooling air is allowed to flow from the first and second outer ducts through the holder case into the intermediary duct for exhaustion,
wherein the second outer duct is designed to experience a larger pressure loss than the first outer duct, so that the cooling air is blown into the intermediary duct and the first and second outer ducts to cool the batteries contained in the holder case,
wherein each of the first and second sub holder cases contains the batteries in a plurality of tiers inside a pair of opposed walls, and the pair of opposed walls are closed, at an inlet side and an exhaust side, by an inlet wall and an exhaust wall to thus obtain a chamber defined by the pair of opposed walls, the inlet wall and the exhaust wall so that the batteries are contained in the chamber,
wherein the inlet wall has an inlet hole, defined on both of lateral portions of the inlet wall, for allowing the cooling air to flow inwardly, so that the cooling air is blown inwardly from the inlet hole into a space defined by and between the battery and the opposed walls, and
wherein the exhaust wall has an exhaust hole, defined in a middle portion of the exhaust wall, for allowing the internal cooling air to flow outwardly, so that the cooling air flowing along a surface of the battery is blown outwardly from the middle portion.

11. The electric power source as recited in claim 10, wherein the opposed walls have a ridge protruding inwardly toward and between two adjacent batteries, and a height of such inwardly protruding ridge is made greater in the leeward side than in the windward side.

12. The electric power source as recited in claim 11, wherein, in the chamber, the first sub holder case contains a first battery, a second battery and a third battery in three tiers along the air-blowing direction, and wherein the opposed walls have a first ridge provided between the first battery and the second battery as well as a second ridge provided between the second battery and the third battery, with the second ridge being made inwardly higher than the first ridge.

13. The electric power source as recited in claim 12, wherein the opposed walls are curved, on both of lateral surfaces of the second ridge, to matingly face a surface of the nearest battery.

14. The electric power source as recited in claim 10, wherein the inner surface is curved, in the vicinity of a boundary between the exhaust wall and the opposed walls, to matingly face the surface of the nearest battery, thus providing an air flow space with respect to the battery.

* * * * *